R. M. SMITH.
AEROPLANE.
APPLICATION FILED DEC. 27, 1912.
1,166,488.
Patented Jan. 4, 1916.
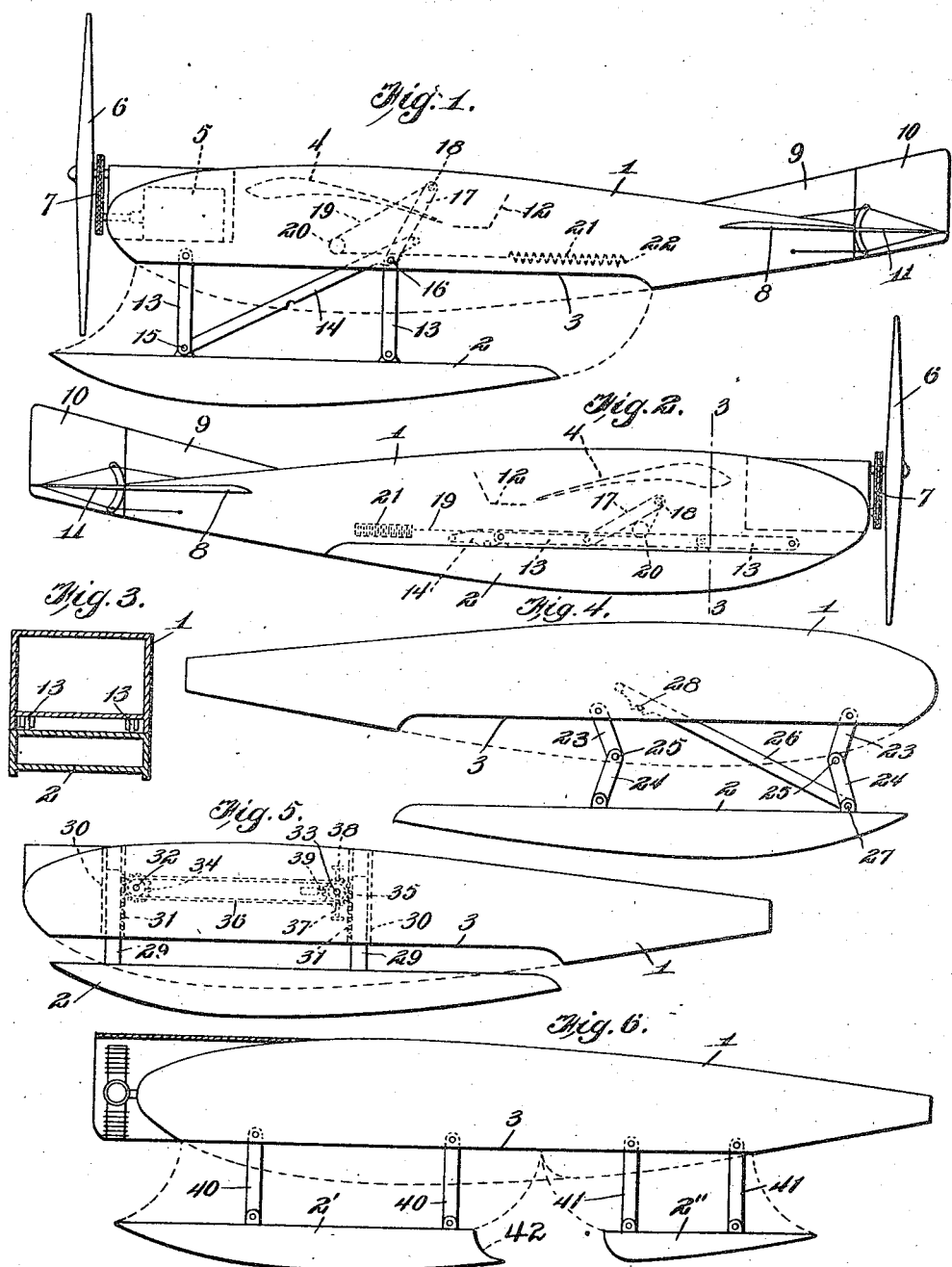
WITNESSES
INVENTOR
Attorney

UNITED STATES PATENT OFFICE.

REXFORD M. SMITH, OF WASHINGTON, DISTRICT OF COLUMBIA.

AEROPLANE.

1,166,488.      Specification of Letters Patent.      Patented Jan. 4, 1916.

Application filed December 27, 1912. Serial No. 738,896.

*To all whom it may concern:*

Be it known that I, REXFORD M. SMITH, a citizen of the United States of America, residing at Washington, in the District of Columbia, have invented a certain new and useful Aeroplane, of which the following is a specification, reference being had therein to the accompanying drawing.

This invention relates to aircraft, and especially aeroplanes, the object of the invention being to provide a body or nacelle of novel construction, and having a general stream line form, the said nacelle embodying two relatively movable sections, one of which is adapted to form a supporting base for the other section, the main body section of the nacelle being designed to have mounted thereon or connected therewith the usual supporting, controlling and power devices, by means of which the machine as a whole is controlled, while traveling along a supporting surface, or while in actual flight in the air.

With the above and other objects in view, the invention consists in the construction, combination, and arrangement of parts, as will be hereinafter more fully described, illustrated in the accompanying drawings, and pointed out in the claims hereunto appended.

In the drawings: Figure 1 is a side elevation of an aircraft or aeroplane, showing the sections of the nacelle or body spread apart. Fig. 2 is a similar view, showing the position of the nacelle sections, when in flight. Fig. 3 is a cross section on the line 3—3 of Fig. 2. Fig. 4 is a side elevation, showing other means for connecting the two sections of the nacelle. Fig. 5 is a similar view, showing other means for effecting the same result. Fig. 6 is a side elevation of a nacelle, showing a plurality of supporting sections connected with the main section.

Referring to the drawings, I have therein shown an aircraft body or car, or as it is technically termed a nacelle, which, in the preferred embodiment of this invention, comprises a main or body section 1, and a launching and alighting supporting base or buoyant section 2, the said sections being separable from each other on the line 3.

In the preferred embodiment of the invention, only a single supporting section 2 is employed, as illustrated in Figs. 1 to 5, inclusive, but in some cases and particularly where the aircraft is of a large size, the supporting portion of the nacelle may be composed of a plurality of supporting sections 2′ and 2″, as illustrated in the side elevation Fig. 6. The main body section 1 is designed for the support of the usual aerial supporting and controlling surfaces, as well as the motor, propeller, and other parts necessary to the control of the machine, while in flight, or preparatory to leaving the supporting surface for flight, or in returning to a landing.

In Figs. 1 and 2, the main supporting surface is designated at 4, the engine at 5, and the propeller at 6, the propeller being shown as connected by means of sprocket and chain elements 7 with the engine shaft. In said figures, 8 designates the fixed tail plane or keel, 9 a vertical keel, 10 the vertical rudder, and 11 the horizontal rudder. 12 represents the aviator's seat.

In order to move the section 2 relatively to the section 1 of the nacelle, various means may be employed, and I, therefore, do not desire to be limited to any special means for effecting the relative adjustment of the said sections 1 and 2 of the nacelle, the essential feature of this portion of the invention residing in providing any suitable means for connecting the two sections of the nacelle together, and rendering them capable of movement toward and away from each other, so that the section 2 may be moved from supporting to non-supporting position, and vice versa.

Under the arrangement illustrated in Figs. 1 and 2, the supporting section 2 is connected by pivotal links 13 to the upper or body section 1, so that the section 2 is adapted to swing on the pivotal centers of said links from its supporting to its non-supporting position, and vice versa. 14 designates a brace which is connected, at 15, to the lower section 2, and which is adapted to engage a stop 16 on the upper section 1, for the purpose of bracing the two sections relatively to each other, and locking said sections either in their nested or closed position, or in the separated or spread condition, illustrated in Fig. 1. Any suitable means may be employed for raising and lowering the bottom section 2 with respect to the top section 1, a simple means being illustrated in Figs. 1 and 2, consisting in extending the rear links 13 above their pivots at the point 16 to form lever extensions 17 connected by a cross bar 18, against which the hands and feet of the operator may be placed for swinging the supporting section 2 up or down. In order to counterbalance the weight of the section 2, a cable 19 is shown as connected to the lever extension 17 and passing from thence around a guide pulley 20, and having its end connected to a contractile spring 21 attached to a fixed point 22 within the main body section 1.

In lieu of the connections illustrated in Figs. 1 and 2, wherein the bottom section swings forwardly as it moves downwardly, the connections may be arranged as shown in Fig. 4, which will permit the bottom section 2 to move in a straight line toward and away from the top section 1. This may be done by constructing the connecting links in pivotally jointed sections, as shown at 23 and 24, the links being connected pivotally together, at 25, so that they will fold after the manner of a measuring rule, as the bottom section is moved toward the top section, said links straightening out as the bottom section is moved away from the top section, as clearly shown in Fig. 4. Any suitable means, such as a brace 26, may be used for locking the bottom section in its supporting position and in fixed relation to the top section 1, and the brace 26 may have a pivotal connection, at 27, with the supporting section of the nacelle, and an interlocked connection, at 28, with the top or body section 1 of the nacelle. Another plan of connecting the top and bottom sections 1 and 2, respectively, is illustrated in Fig. 5, in which the bottom section is shown as provided with posts 29 which slide in tubes 30 in the top section 1. The posts 29 may be provided with rack teeth 31 which are engaged by spur gear wheels on two parallel shafts 32 and 33, each of said shafts being provided with a sprocket wheel 34 and 35 connected by a sprocket chain 36. One of the shafts may be provided with cranks 37 and pedals 38, by means of which the operator may raise and lower the bottom section 2 of the nacelle in a manner readily understood. A suitable lock 39 in the form of a sliding bolt or pivoted dog may be used for locking the raising and lowering mechanism, so as to hold the bottom section 2 of the nacelle either in an elevated or depressed position.

Under the arrangement shown in Fig. 6, the bottom section is shown divided into a plurality of sections 2' and 2'', and said sections are connected by links 40 and 41 to the body section 1 of the nacelle, so that in swinging downwardly, the front section, for example, will swing toward the front, and the rear section toward the rear, thereby leaving an intervening space between the two sections. This gives a greater fore and aft length to the supporting base and adapts it for bodies of unusual length. It will be further noted in Fig. 6 that the rear end of the forward supporting section 2' is concaved or cut away, as shown at 42, to conform to the forward end of the rear section 2'', so that the two sections of the bottom will nest together when drawn upwardly into contact with the top section 1, as indicated in dotted lines in Fig. 6.

From the foregoing description, it will be understood that the leading feature of the invention resides in providing a nacelle which is composed of the machine body, and a supporting base, the said parts being so divided and combined that when brought together, they will form a stream line body or nacelle, which may be propelled through the air with a minimum amount of head resistance. In other words, when the machine is in flight, no head resistance whatever will be caused by the supporting base upon which the machine rests, while not in flight. As the said supporting base as a whole is included within the confines or outer contour of the nacelle, the two sections of the nacelle form complementary portions of each other. The means for spreading the two sections of the nacelle apart and drawing them together, and the means for counter-balancing the supporting section of the nacelle, and for locking the sections in fixed relation to each other, when brought together and when spread apart, are merely incidentals, and any suitable mechanism for this purpose may be provided, without departing from the spirit of this invention. Furthermore, the use of the nacelle is not restricted to any particular type of machine, as it is equally applicable to monoplanes, biplanes, and multiplanes, whether wholly of the heavier than air type, or of the lighter than air type, or a combination of the two.

The invention hereinabove described may be used in connection with hydroaeroplanes, motor sleds and other water and land craft. For hydroaeroplane work, the supporting base may, if desired, have the bottom thereof stepped. The engine may be utilized for shifting the supporting base to supporting and non-supporting position.

What is claimed is:—

1. In air craft of the character specified, a closed nacelle having a relatively movable supporting base portion forming a complementary part thereof and movable up and down with relation thereto.

2. In air craft of the character specified, a closed nacelle having a supporting undercarriage, and means for adjusting said undercarriage upwardly against the bottom and within the stream line thereof.

3. In craft of the character specified, a closed nacelle embodying an undercarriage comprising fore and aft members adapted to be moved into such relation to the nacelle as to form in connection therewith a stream line body.

4. In craft of the character specified, a closed stream line nacelle having a separable supporting bottom section forming a launching and alighting base, said base being movable up and down relatively to the upper section and adapted to be housed within the stream line thereof.

5. In craft of the character specified, a nacelle having a bottom section forming a complementary part thereof, said bottom section being movable downwardly in spaced relation to the body of the nacelle to provide an undercarriage for said body of the nacelle.

6. In craft of the character specified, a nacelle having a bottom section forming a complementary part thereof, said bottom section being movable downwardly in spaced relation to the body of the nacelle to provide a launching and alighting base for said body of the nacelle.

7. In craft of the character specified, a nacelle having a bottom section forming a complementary part thereof, said bottom section being movable downwardly in spaced relation to the body of the nacelle to provide a launching and alighting base for said body of the nacelle, and means for raising and lowering said bottom section.

8. In craft of the character specified, a nacelle having a bottom section forming a complementary part thereof, said bottom section being movable downwardly in spaced relation to the body of the nacelle to provide a launching and alighting base for said body of the nacelle, and means for raising and lowering said bottom section while in flight.

9. In craft of the character specified, a nacelle having a base portion forming a complementary part thereof and movable up and down with relation thereto, said base portion being shaped to provide a surface against which the air pressure acts with a lifting pressure while in flight.

10. In craft of the character specified, a nacelle having a base partion forming a complementary part thereof, and movable up and down with relation thereto, said base portion being shaped to provide a surface against which the air pressure acts while in flight to press said base portion rearwardly and upwardly toward the body of the nacelle.

11. In craft of the character specified, a nacelle having a base portion forming a complementary part thereof and movable up and down with relation thereto, said base portion being shaped to provide a surface against which the air pressure acts while in flight to press said base portion upwardly toward the body of the nacelle.

12. In craft of the character specified, a nacelle composed of complementary upper and lower sections, means for relatively spreading said sections apart and drawing them together, and means for counterbalancing the weight of the lower section.

13. In craft of the character specified, a nacelle composed of complementary upper and lower sections, means for relatively spreading said sections apart and drawing them together, and means on the upper section for counterbalancing the weight of the lower section.

14. In craft of the character specified, an aeroplane nacelle comprising an upper body section and a bottom section movable toward and away from said upper section and forming a launching and alighting base.

15. In air craft of the character specified, an aeroplane nacelle divided longitudinally into a body section and a supporting section forming a launching and alighting base, the last-named section being connected with the body section for movement toward and away from the body section and adapted to sustain the body section out of contact with the surface on which the structure as a whole rests when not in aerial flight.

16. In a flying machine, a stream line nacelle having a bottom section forming a complementary part thereof, said bottom section being movable downwardly in spaced relation to the body of the nacelle to provide a launching and alighting surface, and means for raising and lowering said bottom section.

17. In craft of the character specified, an aeroplane nacelle divided into separable sections forming an aeroplane body and a boat body, the sections being separable in a common relative plane and when brought together constituting the nacelle.

18. In craft of the character specified, a nacelle composed of complementary upper and lower sections, means for relatively spreading said sections apart and drawing them together, and means for locking the sections in fixed relation to each other.

19. In craft of the character specified, a nacelle composed of complementary upper and lower sections, and means for relatively spreading said sections apart and drawing them together, the lower section embodying a hydroplane surface and being adapted to support the upper section clear of the surface on which the structure as a whole rests when not in aerial flight.

20. In craft of the character specified, a nacelle composed of complementary upper and lower sections, and means for relatively spreading said sections apart and drawing them together, the lower section embodying a surface which acts both as a hydroplane and aeroplane surface and is adapted to support the upper section clear of the surface on which the structure as a whole rests when not in aerial flight.

21. In craft of the character specified, a closed stream line nacelle comprising an upper man-carrying body section, and a lower supporting section movable downwardly from the upper section and forming a launching and alighting base.

22. In craft of the character specified, a closed stream line nacelle comprising an upper man-carrying body section, a lower supporting section movable downwardly from the upper section and forming a launching and alighting base, and means carried by the upper section for raising and lowering the lower section while in flight.

23. In craft of the character specified, a closed stream line nacelle comprising an upper man-carrying body section, a lower supporting section movable downwardly from the upper section and forming a launching and alighting base, and manually controlled means for raising and lowering the lower section while in flight.

24. In craft of the character specified, a nacelle comprising an upper body and an under body superimposed one upon the other, the under body being movable downwardly in relation to the upper body and serving in such relation as a launching and alighting base which supports the upper body clear of the surface on which the structure as a whole is supported when the craft is not in aerial flight.

25. In craft of the character specified, a nacelle comprising upper and lower sections superimposed one upon the other, and means for spreading said sections apart which still preserving the order of their arrangement, the lower section forming a launching and alighting base.

26. In air craft, a stream line body embodying separable but connected sections one of which constitutes a supporting base when moved away from its complemental section, said sections having a limited amount of movement relatively to each other.

In testimony whereof I affix my signature in presence of two witnesses.

REXFORD M. SMITH.

Witnesses:
  C. C. HINES,
  BENNETT JONES.